United States Patent
Liu

(10) Patent No.: US 8,881,248 B2
(45) Date of Patent: Nov. 4, 2014

(54) SERVICE PROVIDER ACCESS

(75) Inventor: Jin Liu, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 134 days.

(21) Appl. No.: 13/121,015

(22) PCT Filed: Oct. 6, 2008

(86) PCT No.: PCT/EP2008/063333
§ 371 (c)(1),
(2), (4) Date: Mar. 25, 2011

(87) PCT Pub. No.: WO2010/040378
PCT Pub. Date: Apr. 15, 2010

(65) Prior Publication Data
US 2011/0265155 A1   Oct. 27, 2011

(51) Int. Cl.
*G06F 21/00* (2013.01)
*G06F 15/16* (2006.01)
*G06F 17/30* (2006.01)
*H04L 29/06* (2006.01)
*H04L 29/08* (2006.01)

(52) U.S. Cl.
CPC ............ *H04L 63/0815* (2013.01); *H04L 67/02* (2013.01); *H04L 63/0884* (2013.01); *H04L 67/2804* (2013.01)
USPC .......................................................... 726/5

(58) Field of Classification Search
CPC .................. G06F 21/00; G06F 2221/2115
USPC ............................................................. 726/5
See application file for complete search history.

(56) References Cited

U.S. PATENT DOCUMENTS

| 7,340,525 | B1 | 3/2008 | Bhatia et al. |
| 7,657,639 | B2 * | 2/2010 | Hinton .......................... 709/229 |

(Continued)

FOREIGN PATENT DOCUMENTS

| CN | 1480852 A | 3/2004 |
| CN | 101006680 A | 7/2007 |
| WO | 03/050743 A1 | 6/2003 |

OTHER PUBLICATIONS

"Security Analysis of the SAML Single Sign-on Browser/Artifact Profile", Thomas Gross, Proceedings of the 19th Annual Computer Security Applications Conference, 2003.

(Continued)

*Primary Examiner* — Dant Shaifer Harriman
(74) *Attorney, Agent, or Firm* — Squire Patton Boggs (US) LLP

(57) ABSTRACT

A method and apparatus for enabling a user to access a service provider is described. The user sends a request from a browser to a proxy server. The proxy server modifies the request by adding data (such as a URL) relating to a location of an identity provider able to provide user credentials for the user and forwards the modified request to the service provider. The modification of the access request may occur before the request is sent to the service provider or in response to an authentication request from the service provider. The data relating to the location of the identity provider may be provided as a header (e.g. an http header).

17 Claims, 4 Drawing Sheets

(56) References Cited

U.S. PATENT DOCUMENTS

| | | |
|---|---|---|
| 2003/0046541 A1 | 3/2003 | Gerdes et al. |
| 2003/0163575 A1 | 8/2003 | Perkins et al. |
| 2003/0163733 A1 | 8/2003 | Barriga-Caceres et al. |
| 2006/0129816 A1* | 6/2006 | Hinton .......................... 713/169 |
| 2006/0218629 A1* | 9/2006 | Pearson et al. .................... 726/8 |
| 2007/0184819 A1 | 8/2007 | Barriga-Caceres et al. |
| 2008/0184339 A1* | 7/2008 | Shewchuk et al. ................. 726/3 |
| 2008/0189778 A1 | 8/2008 | Rowley |

OTHER PUBLICATIONS

"Trusted Identity and Session Management Using Secure Cookies", Joon S. Park, et al., Data and Applications Security, 2005, pp. 310-324.

"Avoidance of Performance Bottlenecks Caused by HTTP Redirect in Identity Management Protocols", Yoshisato Takeda, et al., Nov. 3, 2006.

First Office Action dated Jun. 3, 2013, issued in corresponding Chinese Application No. 200880131426.3.

* cited by examiner

SERVICE PROVIDER ACCESS

The invention relates to identity management and, more specifically, to access to identity management information.

Federated identity management, or the "federation" of identity, describes the technologies that serve to enable the portability of identity information across otherwise autonomous security domains. A goal of identity federation is to enable users of one domain to access data or systems of another domain seamlessly and securely, and without the need for redundant user administration. Eliminating the need for repeated login procedures each time a new application or account is accessed can substantially improve the user experience.

FIG. 1 is a block diagram demonstrating the concept of identity management. FIG. 1 shows a system, indicated generally by the reference numeral 2, comprising an end user 4, a service provider 6 and an identity provider 8. When the end user 4 of the system 2 wants to access a secure resource at the service provider 6, and the service provider 6 requires the user's identity to be authenticated, the identity provider 8 can be used to provide the required authentication information to the service provider.

FIG. 2 shows an algorithm, indicated generally by the reference numeral 10, showing how the system 2 can be can be used to provide the end user 4 with access to a secure service provided by the service provider 6.

The algorithm 10 starts at step 12, at which step the end user 4 sends a message to the service provider 6 (for example using a web browser) requesting access to a particular application provided by the service provider. The service requires user credentials, which credentials are not provided in the request.

The algorithm 10 moves to step 13, at which step a discovery process is carried out. The discovery process 13 determines the location of the identity provider 8. Next, the algorithm 10 moves to step 14, at which step the service provider redirects the user to the identity provider 8. The algorithm 10 then moves to step 16, where the identity provider 8 provides user credential data to the service provider 6. In response to receiving the user credentials, the service provider 6 grants the user access to the requested service (step 18).

The discovery step (step 13) of the algorithm 10 involves determining the location of the service provider and providing that information in a form that can be communicated to the user. The service provider typically also requires information relating to the protocol required to communicate with that identity provider, including information such as the data content required and the format of that data.

One approach of overcoming the need for a discovery process is to define a single identity provider that must be used in order to use the service provider 6; however, this approach is inflexible, since it requires all users to have an account with that identity provider. An alternative approach is to require the user to manually input the address of the identity provider being used by that user. This is inconvenient for the user and is vulnerable to user errors.

The present invention seeks to address at least some of the problems outlined above.

According to an aspect of the invention, there is provided a method comprising the steps of: receiving a request from a user for access to a service provider; modifying the request by adding data relating to a location of an identity provider able to provide user credentials for the user; and forwarding the modified request to the service provider. The location data may be in the form of an address of the identity provider. The location data may, for example, be in the form of a uniform resource locator (URL), an Internet Protocol (IP) address, an extensible resource indicator (XRI), an OpenID identity, or any other form that enables the service provider to find the identity provider. The step of modifying the user's request may be implemented by a proxy server.

Another aspect of the present invention provides an apparatus (such as a proxy server) comprising: a first input adapted to receive a service access request from a user; and a first output adapted to send a modified service access request to a service provider, wherein the apparatus is adapted to generate said modified service access request by adding data (for example in form of a header, such as an http header) relating to a location of an identity provider able to provide user credentials for the user to the service access request received from said user. The location data may be in the form of an address of the identity provider. The location data may, for example, be in the form of a uniform resource locator (URL), an Internet Protocol (IP) address, an extensible resource indicator (XRI), an OpenID identity, or any other form that enables the service provider to find the identity provider.

A further aspect of the present invention provides a system comprising a service provider and a proxy server, wherein: the proxy server is adapted to receive a service access request from a user; the proxy server is adapted to modify the request by adding data relating to a location (often an address, such as a uniform resource locator (URL), an Internet Protocol (IP) address, an extensible resource indicator (XRI), an OpenID identity, or any other form that enables the service provider to find the identity provider) of an identity provider able to provide user credentials for the user and to send the modified service access request to the service provider; and the service provider is adapted to redirect the user to the identity provider for the purposes of user authentication. The location data may be provided as a header, such as an http header.

Thus, some forms of the invention enable a service provider to receive data regarding the location of an identity provider that is able to provide user credentials for the user. This step can be carried out without requiring any input from the user. In particular, the user is not required to remember and input location information (such as a URL) for his identity provider.

Thus, service providers in accordance with aspects of the present invention can be arranged to offer a better user experience, since the user's focus does not need to shift between the service provider and an identity provider. Further, systems in accordance with aspects of the invention can be configured so that the user does not need to login to an identity provider before accessing a particular service provider, thereby further improving the user experience.

A further advantage is that, according to aspects of the present invention, it is not necessary to install any additional software or hardware at the user's front end in order for the invention to be used. For example, any terminal with a web browser can access a proxy server that is adapted in accordance with aspects of the invention.

In some forms of the invention, the user need not enter user credentials at either the service provider or the identity provider. This is not only convenient for the user, but increases security by preventing malicious programs from seeking user credentials from keystrokes made by the user (so-called "phishing" attacks).

In some forms of the invention, the modified service access request is generated directly, without requiring any specific user intervention, such that the process of modifying the service access request is hidden to the user.

The modified request may be generated in response to the user's request for access to the service provider. In such an arrangement, the service provider is not required to request user details, since those details are automatically added. Indeed, the user details could be added before any information is sent to the service provider.

Alternatively, the modified request may be generated in response to the service provider requesting user authorization. By way of example, the modified request may be generated in response to an HTTP 401 Unauthorized response from the service provider.

In some forms of the invention, the data relating to the location of the identity provider added to the request are provided as a header, such an http header.

The data relating to the location of the identity provider may be provided by the identity provider in response to a request. For example, a proxy server may request that the identity provider provides suitable data: the identity provider may return data (such as a uniform resource locator) for insertion into a header.

In some forms of the invention, the modifying step is carried out by a proxy server, such as an http proxy server. The receiving and/or the forwarding steps may also be carried out by the proxy server. In the use of the present invention, the user may configure a browser he is using to route service requests via the proxy server.

In some forms of the invention, a user identity is set in response to the step of receiving a request from the user for access to a service provider. The user identity may be determined based on settings provided by the user. For example, the user identity may be one of a public identity, a private identity or a random identity. A public identity (such as the user's name) may be appropriate when dealing with a highly trusted website. A random identity may be appropriate when dealing with less trusted website.

According to an aspect of the present invention, there is provided a method comprising the steps of: receiving a service request at a service provider from a user, the request including a header (such as an http header) containing data relating to a location of an identity provider able to provide credentials for the user; retrieving the location of the identity provider from the header; and requesting the credentials of the user from the identity provider. The location data may be in the form of an address of the identity provider. The location data may, for example, be in the form of a uniform resource locator (URL), an Internet Protocol (IP) address, an extensible resource indicator (XRI), an OpenID identity, or any other form that enables the service provider to find the identity provider.

According to an aspect of the present invention, there is provided a service provider comprising: an input for receiving a service access request for a user, the request including data (such as an address) relating to a location of an identity provider able to provide credentials for the user; means for retrieving the location data relating to the identity provider from the header; and means for requesting the credentials of the user from the identity provider The location data may, for example, be in the form of a uniform resource locator (URL), an Internet Protocol (IP) address, an extensible resource indicator (XRI), an OpenID identity, or any other form that enables the service provider to find the identity provider. The location data may be provided as a header, such as an http header.

According to an aspect of the present invention, there is provided a computer program product comprising: an input adapted to receive a service access request from a user; and an output adapted to send a modified service access request to a service provider, wherein the computer program product is adapted to add data relating to a location of an identity provider able to provide user credentials for the user to the service access request received from said user. The computer program product may be adapted to modify the request in response to the user's request, without requiring the service provider to request user credentials. Alternatively, the computer program product may be adapted to modify the request in response to the service provider requesting user authorization. The computer program product may, for example, be a proxy server. The computer program product may include the identity provider.

A further aspect of the present invention provides a data structure comprising a request to provide a user with access to a service provider, wherein the request includes a header providing data relating to a location of an identity provider able to provide credentials for the user. The data relating to a location of an identity provider may be an address, such as a uniform resource locator (URL), an Internet Protocol (IP) address, an extensible resource indicator (XRI), an OpenID identity, or any other form that enables the service provider to find the identity provider. The request may take the form of an http request.

Embodiments of the invention are described below, by way of example only, with reference to the following numbered Figures.

Figure 3:
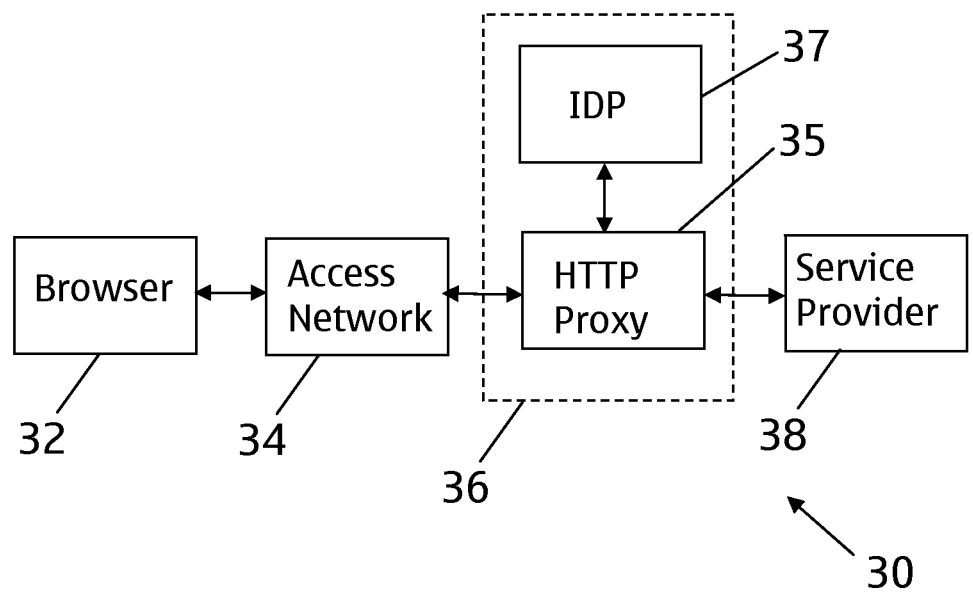
FIG. 3 is a block diagram of a system in accordance with an aspect of the present invention.

FIG. 3 is a block diagram of a system, indicated generally by the reference numeral 30, in accordance with an aspect of the present invention. The system 30 comprises a user browser 32, an access network 34, a proxy server 36 and a service provider 38. The proxy server 36 comprises an http proxy 35 and an identity provider 37. The http proxy 35 and the identity provider 37 may be physically provided at the same location as part of the proxy server 36, or they may be physically separated. Furthermore, the http proxy 35 and the identity provider may be controlled by the same company (such as a telecommunications operator) or by separate companies.

In order to access services provided by the service provider 38, the user points his browser 32 to the proxy server 36. This connection is achieved via the access network 34. The proxy server 36 communicates with the service provider 38 as discussed in detail below. Data is transferred between the service provider 38 and the user's browser 32 via the proxy server 36.

Figure 4:
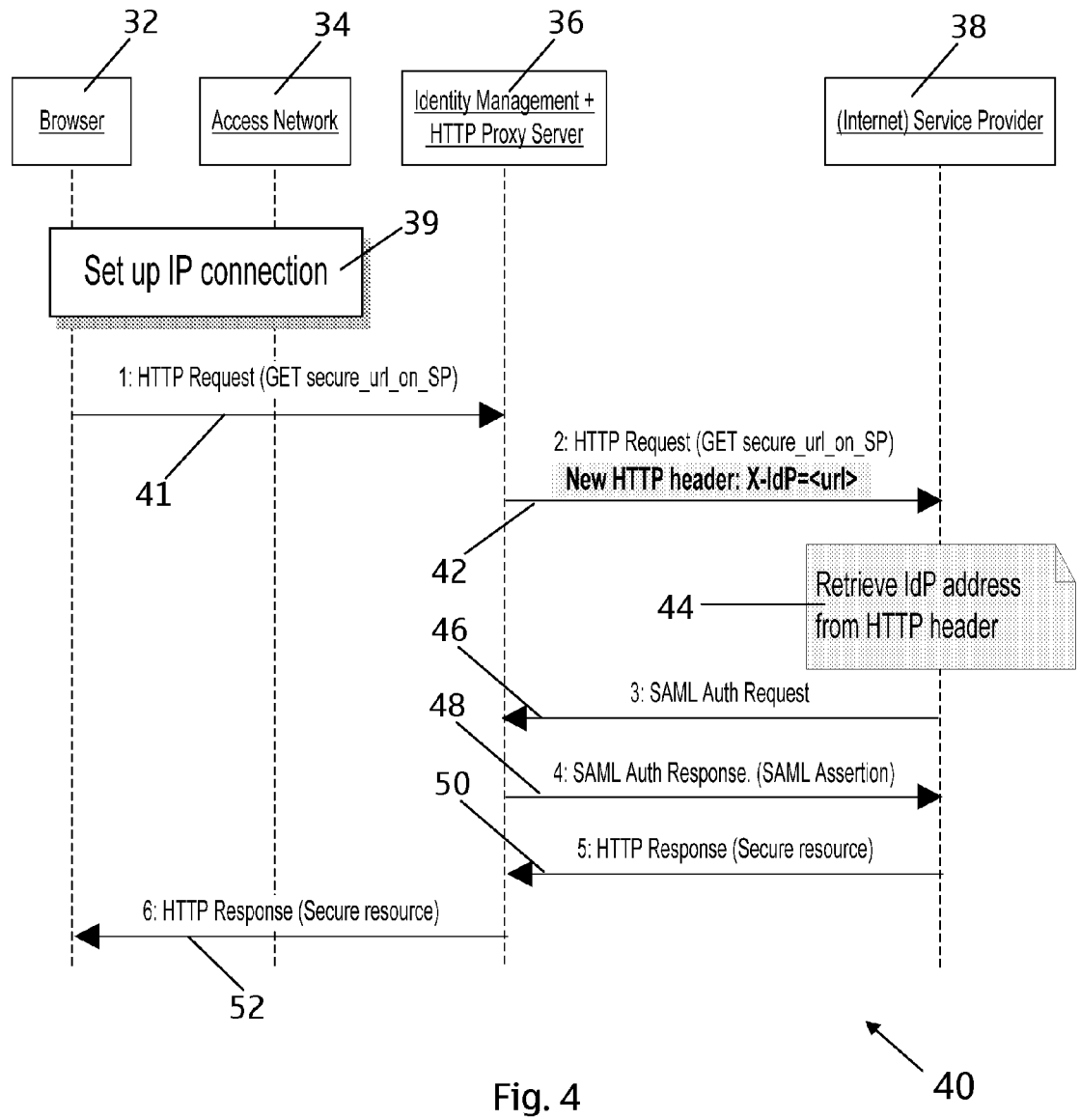
FIG. 4 shows a message sequence in accordance with an aspect of the present invention.

FIG. 4 shows an exemplary sequence of messages, indicated generally by the reference numeral 40, between the elements of the system 30, in accordance with an aspect of the present invention.

First, the user browser 32 sets up an internet protocol (IP) connection via the access network 34 (as indicated by the reference numeral 39).

Once an IP connection has been established, the message sequence begins with a service access request (message 41) issued by the user browser 32 to the proxy server 36. For example, the message 41 may take the form of an HTTP GET request, such as "GET secure_url_on_SP".

The proxy server 36 receives the service access request 41 and constructs a uniform resource location (URL) identifying a location of the identity provider 37 where credentials for the user can be obtained. The URL may have the general form http://idp.operator.com. Alternatively, the URL may have a user-specific form, such as http://idp.operator.com/user_id, where the user ID is generated based on preferences set by the user.

The URL generated by the proxy server 36 is inserted as a header (X-IDP=<identity_provider_location>) in the GET request received by the proxy server 36 from the browser 32. The new GET request, indicated by the reference numeral 42, including the new header, is forwarded to the service provider 38.

Figure 1:
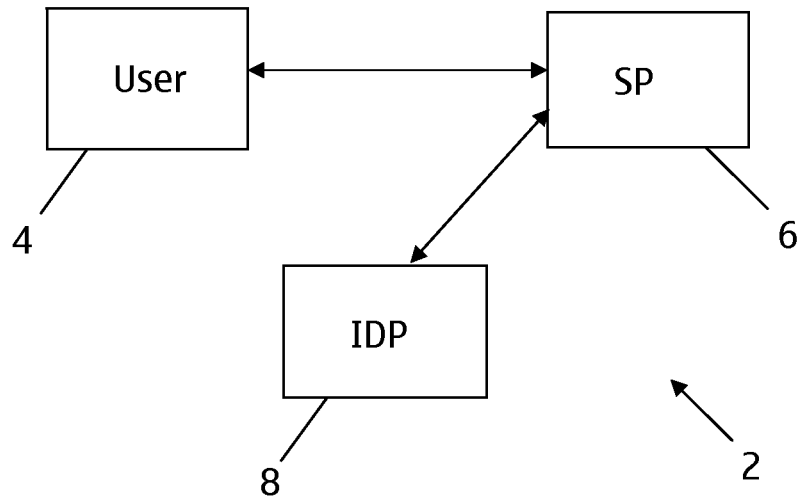
FIG. 1 is a block diagram demonstrating the use of identity management in the prior art.
Figure 2:
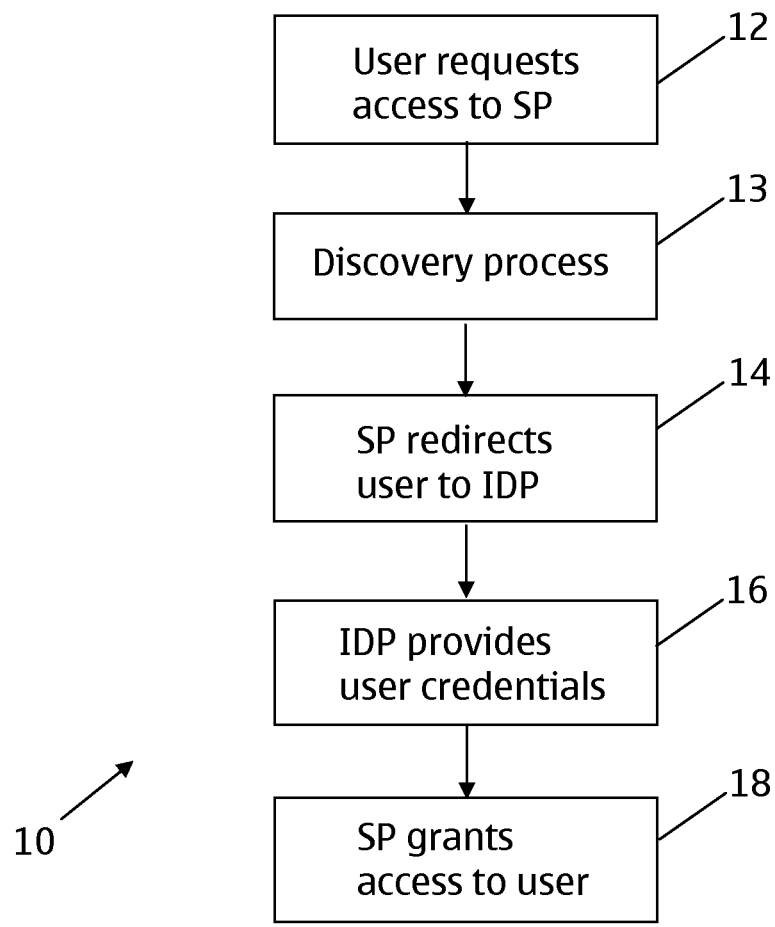
FIG. 2 is a flow chart demonstrating a known use of the arrangement of FIG. 1.

On receipt of the modified GET request 42, the service provider 38, at step 44, retrieves the identity provider (IDP) address from the header field inserted by the proxy server 36. The process of authenticating the user can then proceed, for example, in the manner described above with reference to FIG. 2.

Thus, at step 46, the service provider 38 requests authentication details for the user from the proxy server 36. The request is routed to the URL given in the header (i.e. to the identity provider 37), for example in accordance with the HTTP standard regarding redirection. In response to the request for authentication details, the identity provider 37 provides user credentials (step 48), for example in the form of a Security Assertion Markup Language (SAML) assertion. Next, the service provider grants the proxy server 36 access to the service (step 50) and the proxy server forwards these details to the browser 32 (step 52). The user can then use the browser to access the service provided by the service provider 38.

The http proxy 35 and the identity provider 37 that form the proxy server 36 can work together in a number of ways. For example, the http proxy 35 may ask the identity provider 37 to provide the URL for insertion into the http header. The identity provider 37 may then take the opportunity to generate a URL which enables the identity provider to look up the user in a simple manner. In addition if the identity provider 37 consists of multiple distributed machines, the URL may be selected so that it points to the least loaded machine.

As discussed above, the proxy server 36 generates a user ID in response to receiving the service access request 41 from the browser 32. The user ID is determined based on user preferences. For example, the user ID may be a public identity, a persistent identity or a random identity.

A public identity is an identity that is directly associated with the user. Examples of a public identity are the user's real name (e.g. Mr John Smith), his postal address, social security number etc. Generally, a user would only use a public identity when visiting a highly trusted and secure web site, such as an online bank.

A persistent identity is a fixed string (e.g. "clever_boy_007") that is associated with the user. In some cases, a user may wish to use the same identity each time he accesses a particular service. In this way, a reputation may be accumulated for that user identity. A public identity could, of course, be used, but if the user does not wish to do this (either for security reasons, or for confidentiality reasons), a persistent identity may be used instead.

A random identity is a string that is changed each time the user accesses a service. For example, when the user accesses a particular entertainment website for the first time, the proxy 36 may generate the user ID "anonymous_1234". When the user visits a different website, or revisits the same website, the proxy 36 may generate a new user ID, such as "anonymous_5678". Using random identities is more secure, since it is more difficult to identify the real identity of the user. Furthermore, using random IDs prevents website from being able to track the activities of an individual user.

The main purpose of selecting between random, persistent and public user IDs is to allow the user to select an appropriate level of privacy. The type of ID to be used can be selected depending on the name or nature of the service being accessed. Furthermore, the user may be able to change user preferences by accessing an operator's customer service web page.

In the protocol described above with reference to FIG. 4, the new HTTP header X-IDP=<identity_provider_location> is inserted by the proxy server 36 when first seeking access to the service provider 38. This is not essential.

Figure 5:
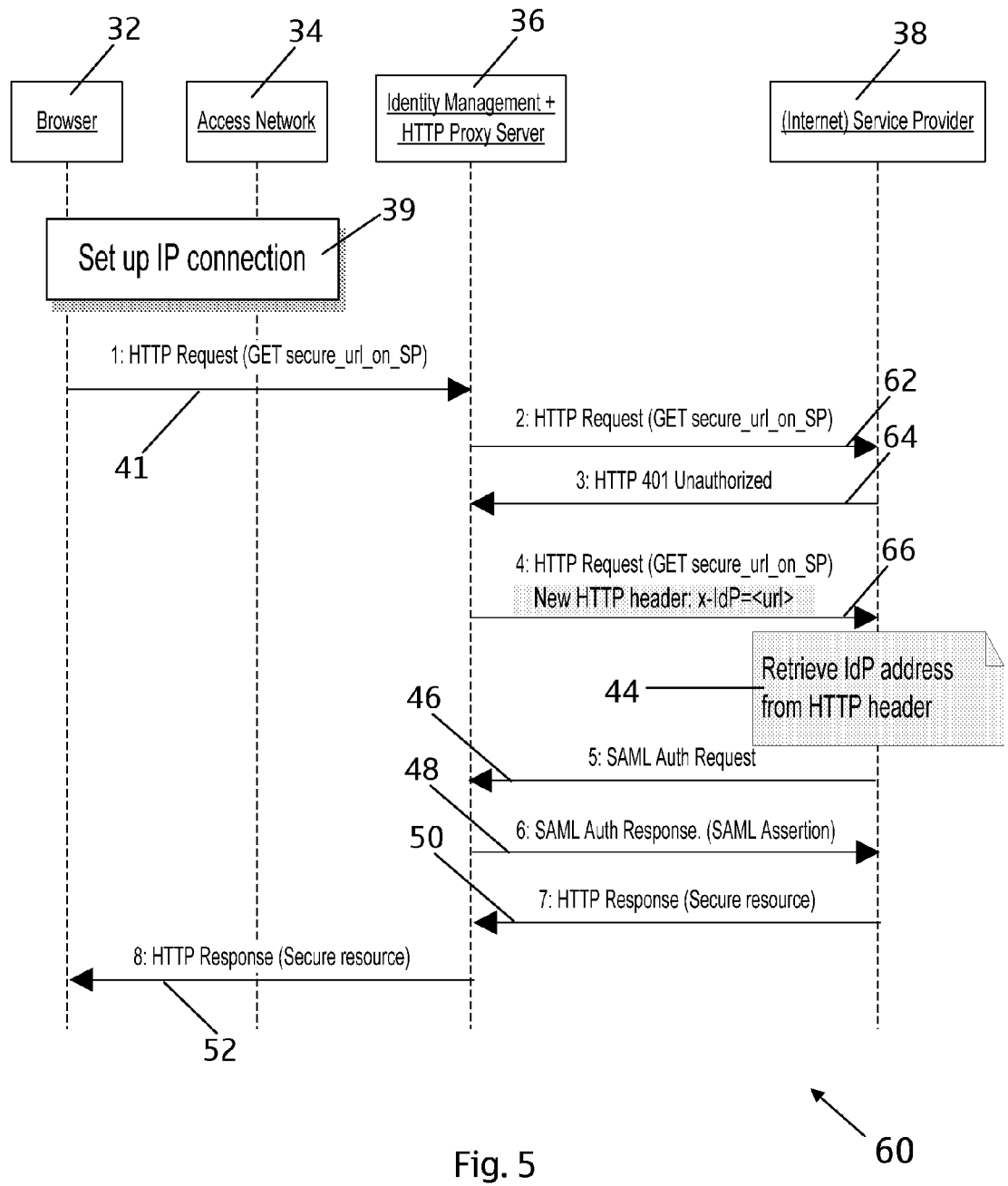
FIG. 5 shows a message sequence in accordance with an aspect of the present invention.

FIG. 5 shows an exemplary sequence of messages, indicated generally by the reference numeral 60, between the user browser 32, the access network 34, the proxy server 36 and the service provider 38, in accordance with an aspect of the present invention.

As before, the message sequence begins with the user browser 32 setting up an internet protocol (IP) connection via the access network 34, as indicated by the reference numeral 39.

Once an IP connection has been established, the message sequence begins with a service access request (message 41) issued by the user browser 32 to the proxy server 36. As noted above with reference to FIG. 4, the message 41 may take the form of an HTTP GET request, such as "GET secure_url_on_SP".

The proxy server 36 receives the service access request and, in response, forwards the GET request to the service provider 38 (message 62). Unlike in the message sequence 40 described above, the message 62 is not modified (at this stage) by the proxy server 36.

The GET request is received by the service provider 38. Since the GET request does not include the required user credentials, the service provider 38 returns a message 64 indicating that the user is unauthorized. In the example of FIG. 5, the message 64 takes the form of an HTTP 401 Unauthorized response.

In response to the Unauthorized message 64, the proxy server 36 generates a user ID based on preferences set by the user. For example, the user ID may be random, persistent and/or public, depending on preferences specified by the user. It is not essential that the User ID be generated at this time; however, since a user ID is not required before the HTTP 401 Unauthorized message is received, it is convenient, in order to reduce the burden on the proxy server, to wait until this time to generate the User ID.

Next, the proxy server 36 constructs a URL for the user: for example, the URL may have the general form http://idp.operator.com or an individual-specific form such as http://idp.operator.com/user_id. The URL generated by the proxy server is inserted as a header (X-IDP=<identity_provider_location>) in a modified GET request. The modified GET request, indicated by the reference numeral 66, including the new header, is forwarded to the service provider 38.

On receipt of the modified GET request 66, the service provider 38, at step 44, retrieves the IDP address from the header field inserted by the proxy server 36 in the previous step in the same manner as described above. The process of authenticating the user can then proceed, for example, in the manner described above with reference to FIG. 4.

Thus, at step 46, the service provider 38 requests authentication details for the user from the identity provider/proxy server 36. The request is routed to the URL given in the header. In response to the authentication request, the identity provider provides user credentials (step 48). Next, the service provider grants the proxy server 36 access to the service (step 50) and the proxy server forwards these details to the browser 32 (step 52). The user can then use the browser to access the service provided by the service provider 38.

In the arrangement described above, the proxy server 36 constructs a Uniform Resource Location (URL) for the user and sends that URL to the service provider. In an alternative embodiment of the invention, the URL is generated by the identity provider 37 and the http proxy 35 sends a query to the identity provider 37 in order to obtain that URL so that it can be forwarded to the service provider 38.

The embodiments of the invention described above include the inclusion of a URL in the header, wherein the URL identifies the location of the identity provider. This is not essential. The header could contain any information that enables the service provider to locate the identity provider. Examples include, but are not limited to, IP addresses, extensible resource identifiers (XRI) and OpenID identifiers.

In the embodiments described above, the user communicates with the proxy server 36 using a browser 32 via an access network 34. The provision of an access network is not essential. Any arrangement which enables the user to communicate with the proxy server and enables the proxy server to communicate with the service provider is sufficient. For example, the proxy server may be provided at a user terminal.

The invention has been described above using http as an exemplary protocol. This is not essential. The http proxy 35 could be replaced by a proxy making use of a different protocol. For example, any protocol that can forward data packets could be used in place of http.

The embodiments of the invention described above are illustrative rather than restrictive. It will be apparent to those skilled in the art that the above devices and methods may incorporate a number of modifications without departing from the general scope of the invention. It is intended to include all such modifications within the scope of the invention insofar as they fall within the scope of the appended claims.

What is claimed is:

1. A method comprising:
   receiving, at a proxy server, a request from a user device for access to a service provider;
   modifying, at the proxy server, the request by adding data identifying a location of an identity provider able to provide user credentials for a user of the user device; and
   forwarding, from the proxy server, the modified request to the service provider,
   wherein the modifying is performed by the proxy server, where the proxy server is different from the user device.

2. A method as claimed in claim 1, wherein the modifying the request is performed in response to the request for access to the service provider.

3. A method as claimed in claim 1, wherein the modifying the request is performed in response to the service provider indicating a lack of user authorization.

4. A method as claimed in claim 1, wherein the data identifying the location of the identity provider added to the request are provided as a header.

5. A method as claimed in claim 1, wherein the data identifying the location of the identity provider added to the request are provided as a uniform resource locator.

6. A method as claimed in claim 1, wherein the data identifying the location of the identity provider are provided by the identity provider in response to a request.

7. A method as claimed claim 1, further comprising:
   setting a user identity in response to receiving the request from the user device for access to the service provider.

8. A method as claimed in claim 7, wherein the user identity is determined based on settings provided by the user device.

9. The method as claimed in claim 1, further comprising:
   receiving at the proxy server a request for authentication in response to the modified request; and
   providing user credentials in response to receiving the request for authentication.

10. The method as claimed in claim 1, wherein the identity provider and the proxy server are co-located with each other.

11. An apparatus comprising:
    a first input configured to receive a service access request from a user device; and
    a first output configured to send a modified service access request to a service provider,
    wherein the apparatus is configured to generate said modified service access request by adding data identifying a location of an identity provider able to provide user credentials for a user of the user device to the service access request received from said user device,
    wherein the apparatus is different from the user device, and wherein said apparatus is a proxy server.

12. An apparatus as claimed in claim 11, wherein the apparatus is configured to add said data identifying the location of the identity provider on receipt of the service access request from said user device.

13. An apparatus as claimed in claim 11, further comprising a second input configured to receive signals from said service provider, wherein the apparatus is configured to add said data identifying the location of the identity provider in response to the service provider requesting user authorization.

14. An apparatus as claimed in claim 11, wherein the data identifying the location of the identity provider is provided as a header.

15. An apparatus as claimed in claim 11, further comprising the identity provider.

16. A system comprising a service provider and a proxy server, wherein:
    the proxy server is configured to receive a service access request from a user device;
    the proxy server is configured to modify the request by adding data identifying a location of an identity provider able to provide user credentials for a user of the user device and to send the modified service access request to the service provider;
    the service provider is configured to redirect the user device to the identity provider for the purposes of user authentication,
    wherein the proxy server is different from the user device.

17. A non-transitory computer-readable medium encoding a computer program product comprising:
    an input configured to receive, at a proxy server, a service access request from a user device; and
    an output configured to send, from the proxy server, a modified service access request to a service provider,
    wherein the computer program product is configured to add data identifying a location of an identity provider able to provide user credentials for a user of the user device to the service access request received from said user device, and
    wherein said modified service access request is performed by said proxy server, where said proxy server is different from said user device.

* * * * *